(12) United States Patent
Kurihara

(10) Patent No.: US 12,510,404 B2
(45) Date of Patent: Dec. 30, 2025

(54) ELECTRONIC APPARATUS, CORRECTION METHOD, AND PROGRAM

(71) Applicant: Sony Interactive Entertainment Inc., Tokyo (JP)

(72) Inventor: Yosuke Kurihara, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 286 days.

(21) Appl. No.: 17/296,843

(22) PCT Filed: Dec. 3, 2019

(86) PCT No.: PCT/JP2019/047133
§ 371 (c)(1),
(2) Date: May 25, 2021

(87) PCT Pub. No.: WO2020/116417
PCT Pub. Date: Jun. 11, 2020

(65) Prior Publication Data
US 2022/0018710 A1   Jan. 20, 2022

(30) Foreign Application Priority Data

Dec. 5, 2018 (JP) .................. 2018-227780

(51) Int. Cl.
*G01J 1/44* (2006.01)
*G01P 21/00* (2006.01)

(52) U.S. Cl.
CPC .............. *G01J 1/44* (2013.01); *G01P 21/00* (2013.01); *G01J 2001/444* (2013.01)

(58) Field of Classification Search
CPC ...... G01J 1/44; G01J 2001/444; G01J 1/0295; G01P 21/00; G01P 3/38
See application file for complete search history.

(56) References Cited

U.S. PATENT DOCUMENTS 9,389,693 B2   7/2016   Junxing
10,260,862 B2   4/2019   Ramalingam
(Continued)

FOREIGN PATENT DOCUMENTS

CN   103858075 A   6/2014
CN   106469536 A   3/2017
(Continued)

OTHER PUBLICATIONS

Office Action for corresponding CN Application No. 201980078582. 6, 28 pages dated Feb. 10, 2023.
(Continued)

*Primary Examiner* — Aniss Chad
*Assistant Examiner* — Nikki Marie M Molina
(74) *Attorney, Agent, or Firm* — Kilpatrick Townsend & Stockton LLP

(57) ABSTRACT

Provided is an electronic apparatus including a vision sensor of an event-driven type including a sensor array having a sensor that generates an event signal when detecting a change of an incident light intensity, an inertial measurement unit (IMU) that is displaced together with the vision sensor, and a correction process section that corrects a measurement result from the IMU or an estimated value based on the measurement result from the IMU, according to the frequency of the event signals.

20 Claims, 4 Drawing Sheets

(56) References Cited

U.S. PATENT DOCUMENTS

| | | |
|---|---|---|
| 10,311,802 B2 | 6/2019 | Hirakata |
| 2012/0078510 A1 | 3/2012 | Ma |
| 2014/0320403 A1* | 10/2014 | Lee .......................... G06F 3/017 |
| | | 345/156 |
| 2015/0260750 A1 | 9/2015 | Sawajiri |
| 2017/0053603 A1 | 2/2017 | Hirakata |
| 2017/0089948 A1* | 3/2017 | Ho ........................ G01C 25/005 |
| 2017/0124693 A1 | 5/2017 | Ramalingam |
| 2018/0146149 A1 | 5/2018 | Suh |

FOREIGN PATENT DOCUMENTS

| | | | | |
|---|---|---|---|---|
| CN | 107430402 A | | 12/2017 | |
| CN | 108289721 A | | 7/2018 | |
| EP | 3158417 B1 | * | 9/2019 | ........... B64C 39/024 |
| JP | 2002267685 A | | 9/2002 | |
| JP | 2014535098 A | | 12/2014 | |
| JP | 2016125988 A | * | 7/2016 | |
| JP | 2018085725 A | | 5/2018 | |
| JP | 2018522348 A | | 8/2018 | |
| WO | WO-2012000603 A1 | * | 1/2012 | .............. G01P 13/00 |
| WO | 2014046204 A1 | | 3/2014 | |

OTHER PUBLICATIONS

Extended European Search Report for corresponding EP Application No. 19892473.0, 8 pages, dated Jul. 27, 2022.

Notice of Reasons for Refusal for corresponding JP Application 2018227780, 5 pages, dated Jan. 28, 2022.

Decision to Grant a Patent for corresponding JP Application No. 2018227780, 4 pages, dated Aug. 30, 2022.

International Search Report for corresponding PCT Application PCT/JP2019/047133, 4 pages, dated Mar. 10, 2020.

Written Opinion for corresponding PCT Application PCT/JP2019/047133, 4 pages, dated Mar. 10, 2020 (for relevancy see the remarks section of the Preliminary Amendment dated May 25, 2021).

International Preliminary Report on Patentability and Written Opinion for corresponding PCT Application PCT/JP2019/047133, 13 pages, dated Jun. 17, 2021.

Notice of Allowance for corresponding KR Application No. 1020217015757, 7 pages dated Jul. 29, 2024.

* cited by examiner

ELECTRONIC APPARATUS, CORRECTION METHOD, AND PROGRAM

TECHNICAL FIELD

The present invention relates to an electronic apparatus, a correction method, and a program.

BACKGROUND ART

A vision sensor of an event-driven type in which pixels each having detected a change of an incident light intensity generate signals in a time asynchronous manner has been known. Such an event-driven vision sensor is advantageous in operating at high speed and with low power compared with a frame-type vision sensor which scans all the pixels for every predetermined cycle, the frame-type vision sensor being typified by an image sensor such as a CCD (Charge-Coupled Device) or a CMOS (Complementary Metal Oxide Semiconductor). For example, PTL 1 and PTL 2 disclose technologies related to such an event-driven vision sensor.

[Citation List] [Patent Literature]

[PTL 1] JP-T-2014-535098 [PTL 2] JP 2018-85725A

[Summary] [Technical Problem]

The abovementioned advantageous effects of the event-driven vision sensor have been known; however, it is hard to say that peripheral technologies have sufficiently been proposed by taking characteristics of the event-driven vision sensor that are different from those of the conventional vision sensor such as the frame-type vision sensor, into consideration.

Therefore, an object of the present invention is to provide an electronic apparatus, a correction method, and a program that can improve the accuracy of a measurement result from an IMU (Inertial Measurement Unit) or the accuracy of an estimated value based on the measurement result from the IMU by means of an event-driven vision sensor.

Solution to Problem

According to one aspect of the present invention, provided is an electronic apparatus including a vision sensor of an event-driven type including a sensor array having a sensor that generates an event signal when detecting a change of an incident light intensity, an IMU that is displaced together with the vision sensor, and a correction process section that corrects a measurement result from the IMU or an estimated value based on the measurement result from the IMU, according to the frequency of the event signals.

According to another aspect of the present invention, provided is a correction method including a step of receiving an event signal from a vision sensor of an event-driven type including a sensor array having a sensor that generates the event signal when detecting a change of an incident light intensity, a step of receiving a measurement result from an IMU that is displaced together with the vision sensor, and a step of correcting the measurement result from the IMU or an estimated value based on the measurement result from the IMU, according to the frequency of the event signals.

According to still another aspect of the present invention, provided is a program causing a processing circuit included in a control section of an electronic apparatus to execute a step of receiving an event signal from a vision sensor of an event-driven type including a sensor array having a sensor that generates the event signal when detecting a change of an incident light intensity, a step of receiving a measurement result from an IMU that is displaced together with the vision sensor, and a step of correcting the measurement result from the IMU or an estimated value based on the measurement result from the IMU, according to the frequency of the event signals.

According to the above configurations, a state in which the electronic apparatus is at a standstill can be determined from the frequency of the event signals, for example. Accordingly, the accuracy of the measurement result from the IMU or the accuracy of the estimated value based on the measurement result from the IMU can be improved by means of the vision sensor of the event-driven type.

DESCRIPTION OF EMBODIMENTS

Hereinafter, some embodiments of the present invention will be explained in detail with reference to the attached drawings. It is to be noted that components having substantially the same functional configuration are denoted by the same reference sign throughout the present description and the drawings and that an overlapping explanation thereof will be omitted.

Figure 1:
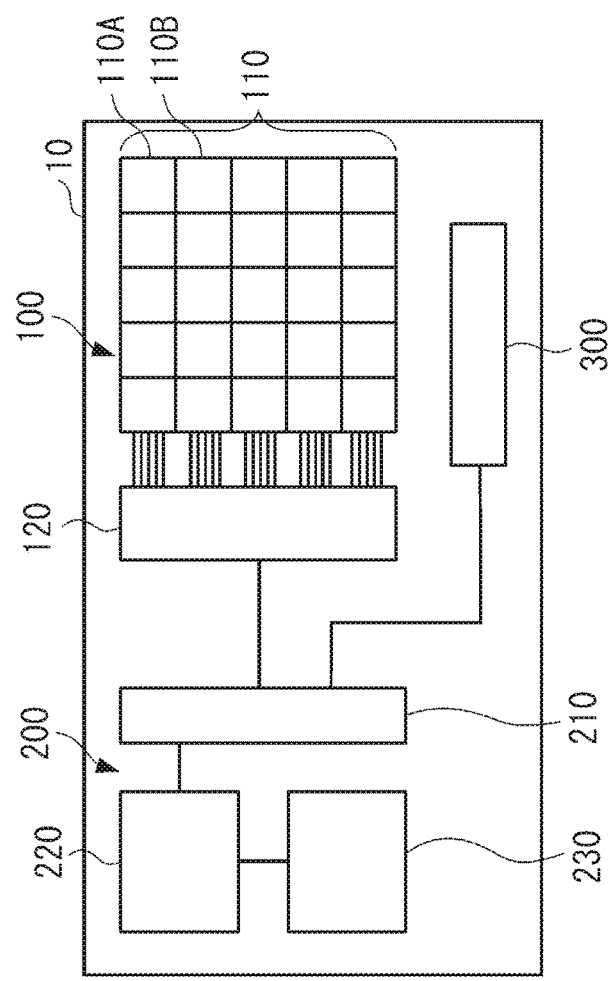
FIG. 1 is a block diagram schematically depicting the configuration of an electronic apparatus according to one embodiment of the present invention.

FIG. 1 is a block diagram schematically depicting the configuration of an electronic apparatus including a sensor module according to a first embodiment of the present invention. As depicted in FIG. 1, an electronic apparatus 10 includes a vision sensor 100, a control section 200, and an IMU 300.

The vision sensor 100 of an event-driven type includes a sensor array 110 that includes sensors 110A, 110B . . . corresponding to image pixels, and a processing circuit 120 that is connected to the sensor array 110. Each of the sensors 110A, 110B . . . includes a light reception element and generates an event signal when detecting a change of an incident light, more specifically, a brightness change. From the processing circuit 120, the event signals are outputted as information indicating, for example, a time stamp, sensor identification information (e.g., pixel position), and the polarity (increase or decrease) of a brightness change. When a subject moves within the angle of view of the sensor array 110, the intensity of light reflected or scattered by the subject changes. Therefore, movement of the subject can be detected on a time-series basis through the event signals generated by the sensors 110A, 110B . . . corresponding to the edge of the subject, for example.

The control section 200 includes a communication interface 210, a processing circuit 220, and a memory 230. The communication interface 210 receives event signals transmitted from the processing circuit 120 of the vision sensor 100 and a measurement result of an acceleration, an angular velocity, etc., transmitted from the IMU 300 and outputs the event signals and the measurement result to the processing circuit 220. The processing circuit 220 is operated according to a program stored in the memory 230, for example, and processes the received event signals and the received measurement result. For example, according to the event signals, the processing circuit 220 generates an image on which a position in which a brightness change has occurred is mapped, on the time-series basis, and temporarily or persistently stores the image in the memory 230 or transmits the image to another apparatus via the communication interface 210. In addition, for example, the processing circuit 220 estimates the attitude angle and displacement of the electronic apparatus 10 by integrating the measurement results of the acceleration, the angular velocity, etc.

The IMU 300 includes a gyro sensor and an acceleration sensor, for example, to detect an angular velocity and an acceleration generated in the electronic apparatus 10. Here, the IMU 300 is at least housed in the same casing as the vision sensor 100 in the electronic apparatus 10 and is displaced together with the vision sensor 100. When a displacement of the electronic apparatus 10 occurs, the IMU 300 detects the angular velocity and the acceleration. Further, the positional relation between the sensors 110A, 110B . . . and the subject changes, and the sensors 110A, 110B . . . corresponding to the edge of the subject, for example, then generate event signals. That is, when a displacement of the electronic apparatus 10 occurs, event signals corresponding to the displacement are generated in the vision sensor 100.

Figure 2:
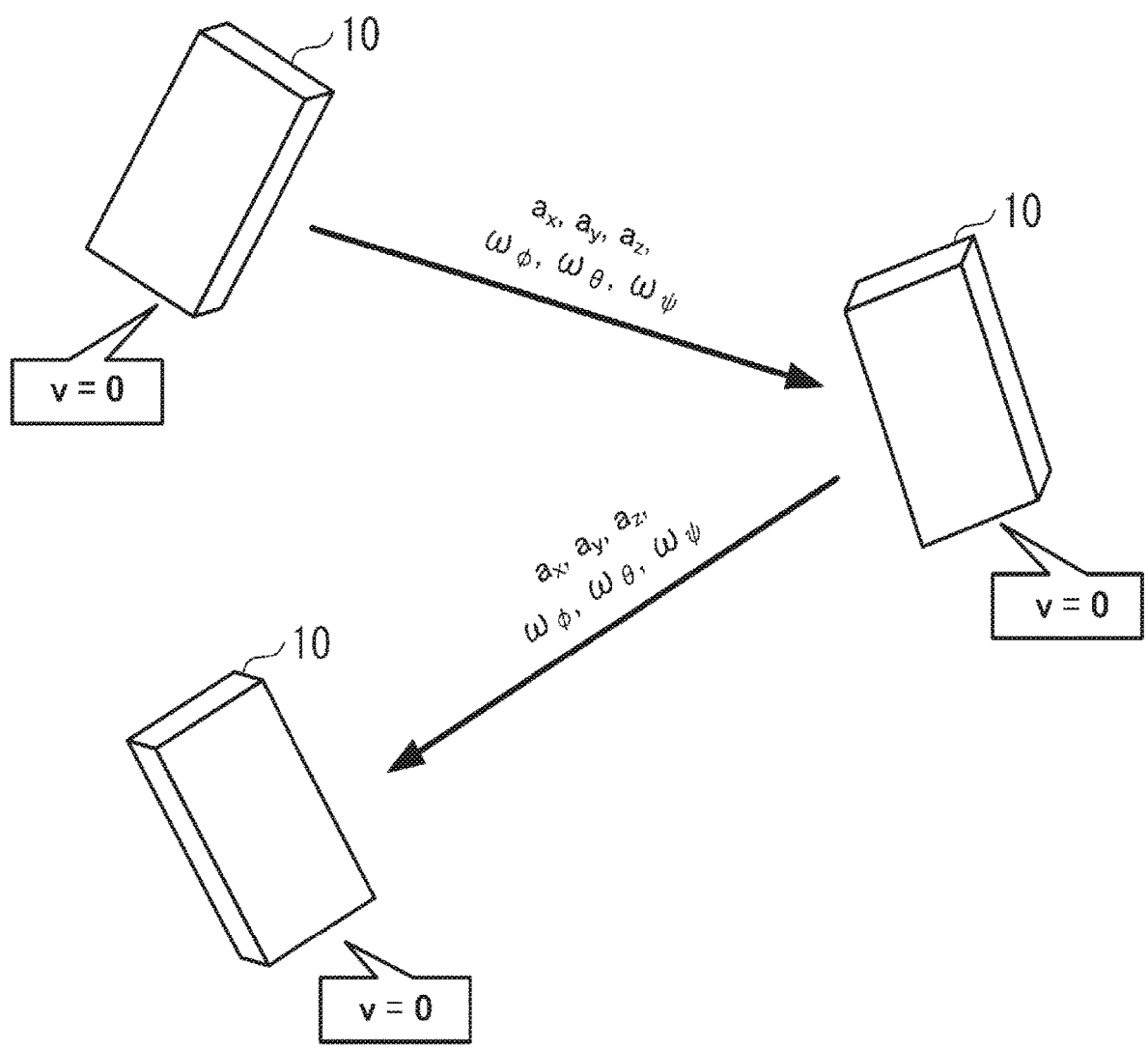
FIG. 2 is a diagram for conceptually explaining a correction timing in the electronic apparatus depicted in FIG. 1.

FIG. 2 is a diagram for conceptually explaining a correction timing in the electronic apparatus depicted in FIG. 1. When a translational and rotational displacement of the electronic apparatus 10 occurs, the IMU 300 detects accelerations ax, ay, and az and angular velocities wo, 00, and @v. The processing circuit 220 of the control section 200 estimates the attitude angle and displacement of the electronic apparatus 10 by integrating the accelerations and integrating the angular velocities, as previously explained. However, as a period of time for the integration becomes longer, errors (which are called drift errors, bias errors, or the like) included in the measurement result obtained by the IMU 300 are integrated. Accordingly, the accuracy of the estimation of the attitude angle and displacement is deteriorated. It is known that the acceleration and the angular velocity become zero at a timing when the electronic apparatus 10 comes to a standstill (v=0). Therefore, errors included in the measurement result can be canceled. However, it is not necessarily easy to identify, from the measurement result, the timing when the electronic apparatus 10 comes to a standstill because an error is included in the measurement result itself obtained by the IMU 300, as previously explained.

Therefore, in the present embodiment, the control section 200 executes a process of correcting a measurement result from the IMU 300 or an estimated value based on the measurement result, according to the frequency of event signals received from the vision sensor 100. More specifically, for example, when the frequency of event signals is low, the control section 200 cancels a drift error or a bias error included in the measurement result. Alternatively, when the frequency of event signals is low, the control section 200 may eliminate an error component from estimated values of an attitude angle and displacement based on the measurement result. As previously explained, the vision sensor 100 is displaced together with the IMU 300, and when a displacement of the electronic apparatus 10 occurs, event signals corresponding to the displacement are generated in the vision sensor 100. In other words, the electronic apparatus 10 can be predicted to be in a standstill state during a period of time in which no event signal is generated by the vision sensor 100. The vision sensor 100 of the event-driven type is operated at higher speed than frame-type vision sensors, for example. Thus, even in a case where the electronic apparatus 10 is momentarily at a standstill, the moment of the standstill can be identified by the above process, so that the measurement result or the estimated value can be corrected. Accordingly, the measurement result or the estimated value can be corrected at high frequency. This results in improvement in the measurement result itself and the accuracy of the estimation of the attitude angle and displacement of the electronic apparatus 10 by the control section 200.

Figure 3:
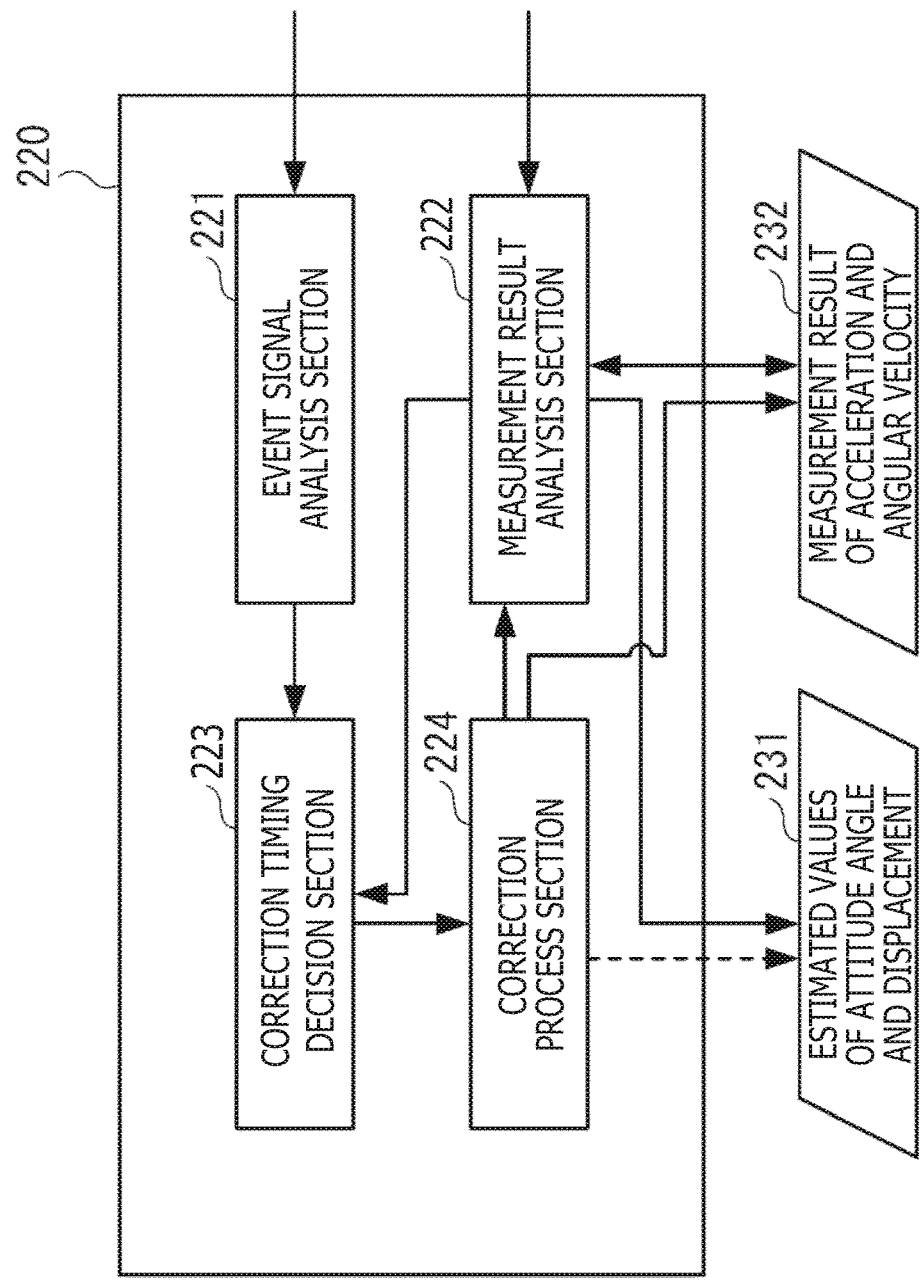
FIG. 3 is a block diagram depicting the functional configuration of a processing circuit of the electronic apparatus depicted in FIG. 1.

FIG. 3 is a block diagram depicting the functional configuration of a processing circuit of the electronic apparatus depicted in FIG. 1. In the example depicted in FIG. 3, the processing circuit 220 of the control section 200 includes an event signal analysis section 221, a measurement result analysis section 222, a correction timing decision section 223, and a correction process section 224, which are functions implemented by being operated according to a program stored in the memory 230, for example. The event signal analysis section 221 analyzes event signals received from the vision sensor 100 via the communication interface 210. Specifically, the event signal analysis section 221 calculates the frequency of the event signals on the basis of time stamps included in the event signals, for example. Meanwhile, the measurement result analysis section 222 analyzes a measurement result of an acceleration, an angular velocity, etc., received from the IMU 300 via the communication interface 210. Specifically, the measurement result analysis section 222 calculates estimated values 231 of the attitude angle and displacement by integrating the accelerations and integrating the angular velocities, for example. Time-series data concerning a measurement result 232 of the acceleration and angular velocity and the estimated values 231 is stored in the memory 230, for example.

The correction timing decision section 223 decides a correction timing corresponding to a standstill state of the electronic apparatus 10, on the basis of the frequency of the event signals calculated by the event signal analysis section 221. When the correction timing is decided by the correction timing decision section 223, the correction process section 224 executes a correction process of the measurement result 232 from the IMU 300 or the estimated values 231 based on the measurement result. Specifically, for example, the correction process section 224 identifies, as an error, a value corresponding to the difference between an actual measurement result and a theoretical measurement result, the theoretical measurement result being obtained during the standstill state of the electronic apparatus 10, specifically, during a state where both the angular velocity and an acceleration other than the gravity acceleration are zero. The correction process section 224 then gives such an offset as to cancel the error, to the measurement result 232 of the acceleration and angular velocity that is obtained by the IMU 300. The correction process section 224 may correct, on a real time basis, the measurement result 232 inputted to the measurement result analysis section 222 after the correction timing, or may afterwards correct a data acquired after the correction timing, the data being included in the time-series data of the measurement result 232 that has already been processed. In a case where the measurement result 232 is corrected afterwards, the measurement result analysis section 222 may calculate the estimated values 231 again.

Figure 4:
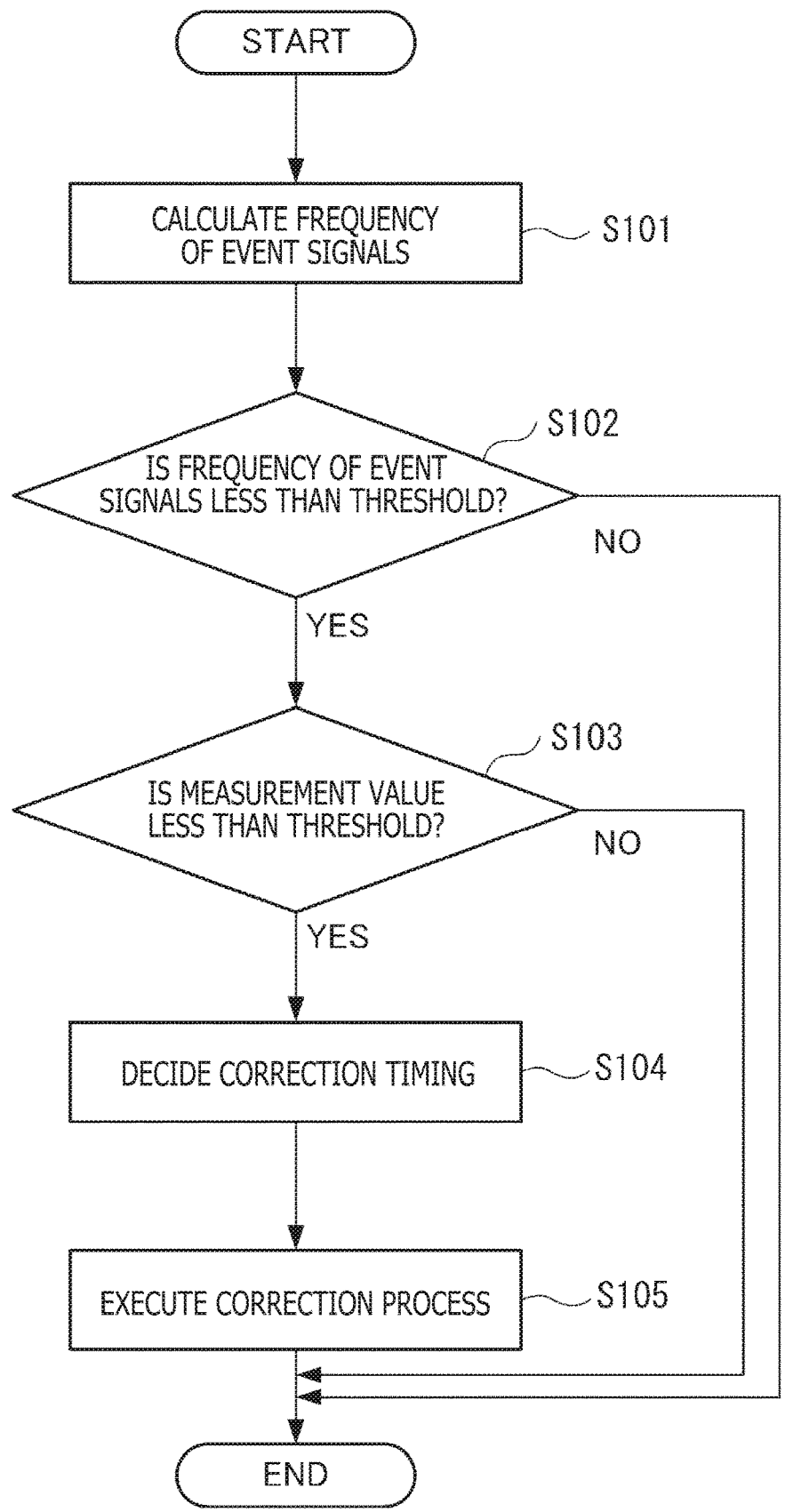
FIG. 4 is a flowchart schematically illustrating an example of processes in the electronic apparatus depicted in FIG. 1.

FIG. 4 is a flowchart schematically illustrating an example of processes in the electronic apparatus depicted in FIG. 1. In the example illustrated in FIG. 4, first, the event signal analysis section 221 calculates the frequency of event signals (step S101). Here, the event signal analysis section 221 may calculate the frequency while sequentially moving a time window, on the basis of the number of event signals received within the last predetermined period of time, for example. Alternatively, the event signal analysis section 221 may calculate the frequency for every predetermined cycle, on the basis of the number of event signals received in the last cycle. Next, the correction timing decision section 223 determines whether or not the frequency of event signals calculated in step S101 is less than a threshold (step S102). Here, in a case where the frequency is equal to or greater than the threshold, the electronic apparatus 10 is determined to be not in a standstill state. Then, the process is finished.

On the other hand, in a case where the frequency of event signals is less than the threshold in step S102, the correction timing decision section 223 may further determine whether or not a measurement value included in the measurement result from the IMU 300 is less than a threshold (step S103). In a case where the surrounding area of the electronic apparatus 10 is dark or where the angle of view of the sensor array 110 is shielded, for example, the electronic apparatus 10 may be not in a standstill state even if the frequency of event signals is low. In order to avoid performing correction of the measurement result or estimated value in such a case, the correction timing decision section 223 may decide the correction timing on condition that a detection value, specifically, the value of an acceleration or angular velocity included in the measurement result from the IMU 300 is less than the threshold and that movement of the electronic apparatus 10 is estimated to be small at a certain level.

In a case where the detection value included in the measurement result from the IMU 300 is less than the threshold in step S103, the correction timing decision section 223 decides a correction timing (step S104), and the correction process section 224 executes the correction process according to the correction timing (step S105). Specifically, the correction process section 224 may correct, on a real time basis, the measurement result 232 inputted to the measurement result analysis section 222 after the correction timing, or may afterwards correct a data acquired after the correction timing, the data being included in the time-series data of the measurement result 232 that has already been processed. In a case where the measurement result 232 is corrected afterwards, the measurement result analysis section 222 may execute a step (not illustrated) of calculating the estimated values 231 again. Alternatively, the correction process section 224 may correct the estimated values 231 that are based on the measurement result.

In the first embodiment of the present invention explained so far, the control section 200 executes a process of correcting the measurement result from the IMU 300 according to the frequency of event signals received from the vision sensor 100. Accordingly, for example, a time point at which the electronic apparatus 10 comes to a standstill can be precisely identified, and an error included in the measurement result can be canceled. Since the error can be cancelled at a higher frequency, the measurement result itself and the accuracy of the estimation of the attitude angle and displacement of the electronic apparatus 10 can be improved.

Some embodiments of the present invention have been explained in detail above with reference to the attached drawings. However, the present invention is not limited to these embodiments. It is clear that a person having the ordinary knowledge in the technical field to which the present invention belongs can conceive of various changes and modifications within the scope of the technical concept set forth in the claims. It should be understood that these changes and modifications are also within the technical scope of the present invention.

REFERENCE SIGNS LIST

10: Electronic apparatus
100: Vision sensor
110: Sensor array
110A, 110B: Sensor
120: Processing circuit
200: Control section
210: Communication interface
220: Processing circuit
221: Event signal analysis section
222: Measurement result analysis section
223: Correction timing decision section
224: Correction process section
230: Memory
231: Estimated value

The invention claimed is:

1. An electronic apparatus comprising:
   a vision sensor of an event-driven type including a sensor array having a sensor configured to generate an event signal when detecting a change of an incident light intensity;
   an inertial measurement unit that is displaced together with the vision sensor; and
   a processing circuit configured to:
   receive a measurement result received from the inertial measurement unit and an estimated value based on the measurement result received from the inertial measurement unit, wherein the estimated value includes an attitude angle and a displacement of the electronic apparatus,
   execute a correction process on the measurement result to correct the measurement result when a frequency of event signals generated by the vision sensor is less than a threshold, wherein the frequency of the event signals is based on a number of event signals received within a predetermined period of time, and
   correct the measurement result using an output of the correction process thereby improving an accuracy of the estimated value including the attitude angle and the displacement of the electronic apparatus based on the output of the correction process.

2. The electronic apparatus according to claim 1,
   wherein the processing circuit is further configured to:
   determine a correction timing corresponding to a standstill state of the electronic apparatus, on a basis of the frequency of the event signals,
   and execute the correction process corrects the measurement result from the inertial measurement unit or the estimated value based on the correction timing.

3. The electronic apparatus according to claim 2, wherein the correction timing is based on the frequency of the event signals being less than the threshold.

4. The electronic apparatus according to claim 3, wherein the correction timing is further based on a detection value included in the measurement result from the inertial measurement unit being less than a threshold.

5. The electronic apparatus according to claim 1, wherein: the measurement result from the inertial measurement unit includes an angular velocity.

6. The electronic apparatus according to claim 1, wherein the sensor array comprises a plurality of sensors, the plurality of sensors including the sensor, wherein each sensor of the plurality of sensors generates an event signal when detecting a change of the incident light intensity.

7. The electronic apparatus of claim 1, wherein the processing circuit is further configured to:
   determine a correction timing based on the frequency of the event signals corresponding to a standstill state of the electronic apparatus;
   determine a theoretical measurement result while the electronic apparatus is in the standstill state; and
   determine a value corresponding to a difference between the measurement result and the theoretical measurement result, wherein the standstill state is a state where both an angular velocity and an acceleration other than gravity of the electronic apparatus are zero, and the value is used to determine the correction timing.

8. The electronic apparatus of claim 7, wherein the processing circuit is further configured to determine an offset to the correction timing in accordance with the value, and wherein the correction process further comprises:
   determining the improvement based on the offset.

9. The electronic apparatus of claim 7, wherein the processing circuit is further configured to:
   analyze the measurement result of an acceleration or an angular velocity of the electronic apparatus; and
   correct the measurement result based on integrating the acceleration or the angular velocity of the electronic apparatus over the predetermined period of time.

10. A correction method, comprising:
   receiving a plurality of event signals from a vision sensor of an event-driven type including a sensor array having a sensor that generates the plurality of event signals when detecting a change of an incident light intensity;
   receiving a measurement result from an inertial measurement unit and an estimated value based on the measurement result received from the inertial measurement unit that is displaced together with the vision sensor, wherein the estimated value includes an attitude angle and a displacement of the electronic apparatus;
   executing a correction process on the measurement result to correct the measurement result when a frequency of the plurality of event signals generated by the vision sensor is less than a threshold, wherein the frequency of the plurality of event signals is calculated based on a number of event signals received within a predetermined period of time; and
   correcting the measurement result using an output of the correction process thereby improving an accuracy of the estimated value including the attitude angle and the displacement of the electronic apparatus based on the output of the correction process.

11. The correction method according to claim 10, wherein the correction timing is decided in a case where a detection value included in the measurement result or the estimated value based on the measurement result received from the inertial measurement unit is less than the threshold.

12. The correction method according to claim 10, wherein the measurement result from the inertial measurement unit includes an angular velocity.

13. The correction method according to claim 10, wherein the sensor array comprises a plurality of sensors, the plurality of sensors including the sensor, wherein each sensor of the plurality of sensors generates an event signal when detecting a change of an incident light intensity.

14. The correction method according to claim 10, wherein the inertial measurement unit is housed in a same casing as the vision sensor in an electronic apparatus.

15. A non-transitory, computer readable storage medium containing a computer program, which when executed by a computer, causes a processing circuit included in a control section of an electronic apparatus to perform a correction method by carrying out actions, comprising:
   receiving a plurality of event signals from a vision sensor of an event-driven type including a sensor array having a sensor that generates the plurality of event signals when detecting a change of an incident light intensity;
   receiving a measurement result from an inertial measurement unit and an estimated value based on the measurement result received from the inertial measurement unit that is displaced together with the vision sensor, wherein the estimated value includes an attitude angle and a displacement of the electronic apparatus;
   executing a correction process on the measurement result to correct the measurement result when a frequency of the plurality of event signals generated by the vision sensor is less than a threshold, wherein the frequency of the plurality of event signals is calculated based on a number of event signals received within a predetermined period of time; and
   correcting the measurement result using an output of the correction process thereby improving an accuracy of the estimated value including the attitude angle and the displacement of the electronic apparatus based on the output of the correction process.

16. The non-transitory, computer readable storage medium according to claim 7, the actions further comprising:
   deciding a correction timing corresponding to a standstill state of the electronic apparatus, on a basis of the frequency of the event signals, wherein the correction process is performed when the correction timing is decided.

17. The non-transitory, computer readable storage medium according to claim 16, wherein the correction timing is decided in a case where the frequency of the event signals is less than the threshold.

18. The non-transitory, computer readable storage medium according to claim 16, wherein the correction timing is decided in a case where a detection value included in the measurement result from the inertial measurement unit is less than the threshold.

19. The non-transitory, computer readable storage medium according to claim 7, wherein the measurement result from the inertial measurement unit includes an angular velocity.

20. The non-transitory, computer readable storage medium according to claim 15, wherein the sensor array comprises a plurality of sensors, the plurality of sensors including the sensor, wherein each sensor of the plurality of sensors generates an event signal when detecting a change of the incident light intensity.

* * * * *